UNITED STATES PATENT OFFICE.

GILBERT SCOTT RAM, OF MONTCLAIR, NEW JERSEY, ASSIGNOR TO THEODORE MACE, OF SAME PLACE.

FILAMENT FOR INCANDESCENT LAMPS.

SPECIFICATION forming part of Letters Patent No. 393,391, dated November 27, 1888.

Application filed January 30, 1888. Serial No. 262,424. (No specimens.)

*To all whom it may concern:*

Be it known that I, GILBERT SCOTT RAM, a subject of the Queen of Great Britain and Ireland, temporarily residing at Montclair, in the county of Essex and State of New Jersey, have invented certain new and useful Improvements in the Manufacture of Filaments for Electric Lamps; and I do hereby declare the following to be a full, clear, and exact description of the invention, such as will enable others skilled in the art to which it appertains to make and use the same.

This invention relates to the manufacture of filaments for incandescent electric lamps, and comprises the preliminary treatment of natural fibers to prepare them for the principal process and the subsequent process of toughening, incorporating metallic oxides, and the final baking.

The invention consists in the various steps and manipulations, substantially as hereinafter fully described and claimed.

In carrying my invention into effect I proceed in the following manner: Nearly all the various species of natural fiber contain, besides the constituents, carbon, hydrogen, and oxygen, a variety of what may be termed "impurities," that in the process of carbonization become mere ash, which I consider detrimental to the success of the final result. I prefer to take some one of the growths which in nature exist in an approximately filamentary form, in suitable lengths, and near about the diameter wanted. I first reduce this to a uniform diameter throughout by pulling it through draw-plates of a proper size. I next treat such fibers in a bath of hydrochloric acid—preferably chemically pure and having a specific gravity of 1.14—for, say, from twenty to thirty minutes. The effect is to dissolve out all the silica and other ash-making impurities of the fiber. The fibers are then washed well in water and dried. I then subject the fibers for a few minutes (the exact length of time depending on the character of the fiber) to the action of strong sulphuric acid. The ordinary commercial acid answers well for this purpose and should have a specific gravity of from 1.7 to 1.8, according to the extent of the following steps to be taken toward the incorporation of metallic oxides. As the other step is, in my preference, the incorporation of alumina by the decomposition of aluminic salts, I graduate the specific gravity of the sulphuric acid with that view and find a gravity of 1.78 to be the most suitable for the purpose. If a pure-carbon filament be wanted, the process will stop here, and after washing and drying the fibers they will be simply baked at a suitable temperature; but as I aim to produce a filament having a greater or less proportion of alumina incorporated therein I proceed in the following manner: After the treatment in the sulphuric-acid bath the fibers are washed in clean water, but are not permitted to dry. While still moist or damp, they are soaked for several hours in a solution of aluminium salt—as, for instance, aluminium chloride, sulphate, or other salt. The fibers are then made ready for baking by winding on carbon-blocks or otherwise, and are then carbonized in the usual way. If the aluminium salt used be hygrometric, it is desirable to keep the fibers dry after soaking by the aid of gentle heat up to the time of carbonization, in order to prevent the gathering of globules of water along their length. The action of the preliminary treatment with hydrochloric acid is to remove the impurities and open up the structure, so as to render the fiber more susceptible to the action of the sulphuric acid, by which it places the fiber in a condition in which it will with great facility absorb the solution of metallic salt in the final step. The final baking at a high temperature has the effect of decomposing the aluminium or other metallic salt and leaving the oxide in the filament; but I wish to state that I lay no claim to the process of incorporation of metallic oxides by the use of a solution which is decomposed by the application of heat.

Natural fibers, when treated in the above manner with strong sulphuric acid and dried, are generally of a yellowish tinge and are extremely strong, elastic, and hard, and will stand a great amount of the roughest handling, and when baked at a high temperature are almost like steel in hardness, elasticity, and density, and are peculiarly well adapted for use as lamp filaments. By "natural fibers" I mean those which have not been treated to any manipulation further than reduction in size to obtain the filamentary form. The action of sulphuric acid upon such fibers is not to be confounded with the action which it has on such manufactured fibers as cotton thread or paper. In the latter the well-known parchmentizing effect is produced—that is, the thread or paper when treated with a mixture of two volumes of concentrated sulphuric acid and one volume of water and then washed is transformed into a substance resembling parchment in appearance and having the same composition as cellulose. In the process the fibrous structure is destroyed and the body becomes translucent and homogeneous in character. By my treatment of the fiber in its natural or unwrought condition the result is different, because the material is different. Cotton and linen are themselves almost pure cellulose without ligneous or woody tissue, and consequently without the stiffness and a certain inflexibility which strongly characterize natural fibers in their normal state. The internal fibrous character is not totally destroyed and the elasticity is very greatly increased.

I claim as my invention—

1. The process of manufacturing filaments, consisting in submitting natural unwrought fibers to the action of strong sulphuric acid, then washing the treated fibers and incorporating metallic salts therein, and finally baking them, substantially as described.

2. The process of manufacturing filaments, consisting in first submitting natural fibers to the action of hydrochloric acid, then washing, next submitting said fibers to a bath of strong sulphuric acid, and then washing and incorporating metallic salts, and finally baking, substantially as described.

In testimony whereof I affix my signature in presence of two witnesses.

GILBERT SCOTT RAM.

Witnesses:
THEO. MACE,
CHARLES E. MAHONY.